E. B. Bigelow.
Weaving Pile Fabric.
No. 147.
Reissued Oct. 9, 1849.
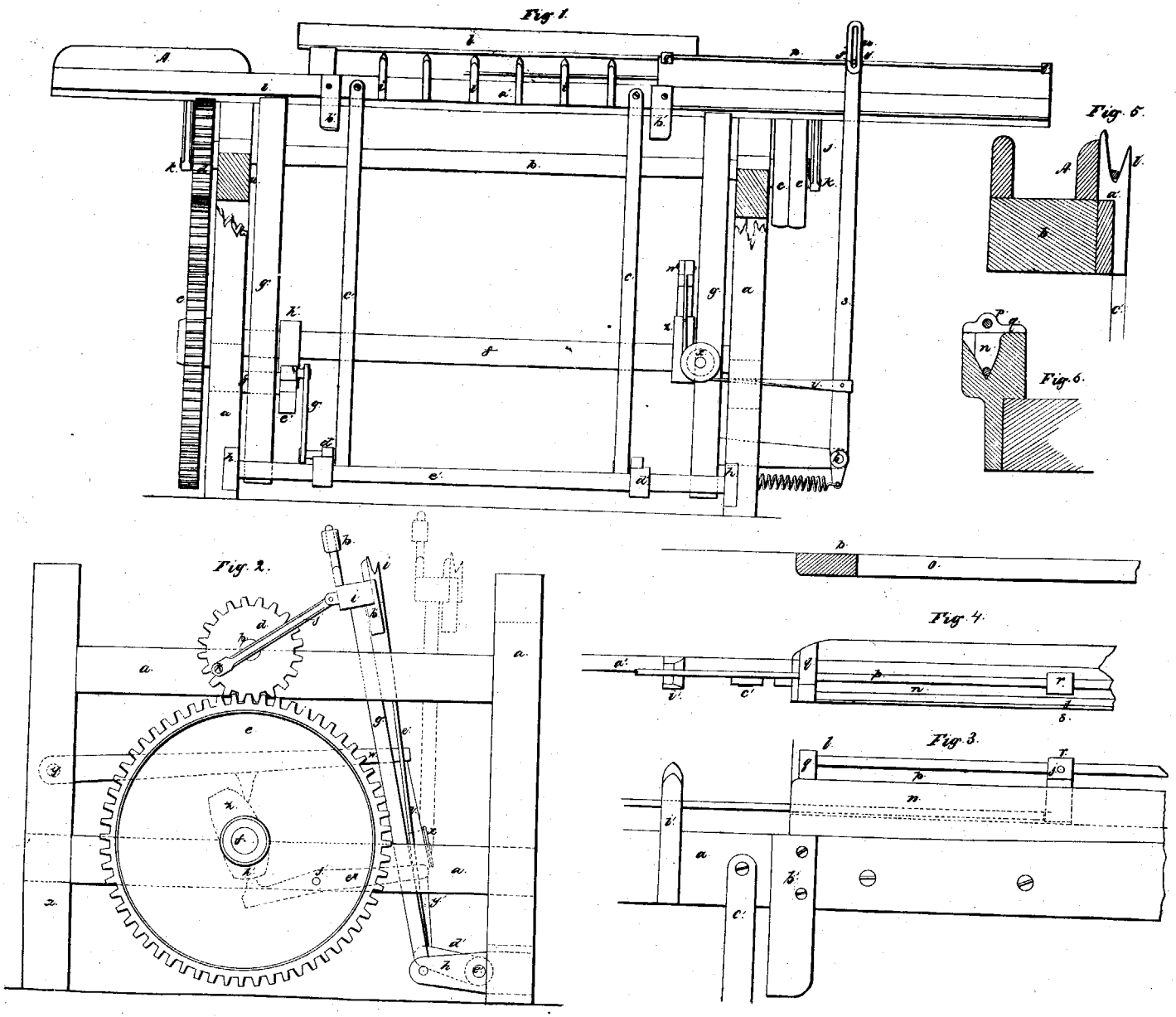
N. PETERS, PHOTO-LITHOGRAPHER, WASHINGTON, D. C.

UNITED STATES PATENT OFFICE.

ERASTUS B. BIGELOW, OF CLINTONVILLE, MASSACHUSETTS.

IMPROVEMENT IN LOOMS FOR WEAVING BRUSSELS CARPET, &c.

Specification forming part of Letters Patent No. 6,153, dated March 10, 1849; Reissue No. 147, dated October 9, 1849.

*To all whom it may concern:*

Be it known that I, ERASTUS B. BIGELOW, of Clintonville, in the county of Worcester and State of Massachusetts, have invented new and useful Improvements in the Power-Loom for Weaving Brussels Carpets and other Similar Wrought Fabrics, of which the following is a full and exact description, reference being had to the accompanying drawings, which form a part of my specification.

The pile-wires employed in weaving brussels carpets and other wide and similarly wrought fabrics by power-looms, are usually too slender to pass between the warps without a support or guide.

In my patent for new and useful improvements in machinery for weaving brussels carpets, dated March 20, 1847, the supporting of the wires as they pass between the warps is made the subject of a claim.

My present improvements consist in guiding and supporting the pile-wires as they pass between the warps by means of a guide or guides, through or on which the said wires slide.

Figure 2 is an end view of the loom. Fig. 1 is a front view with the breast-beam removed to show the lathe. Fig. 3 is an enlarged view of a part of the right-hand end of the race-beam and trough for receiving the wires. Fig. 4 is a plan of the same. Fig. 5 is a section of the lathe showing the wire-guide. Fig. 6 is a section of the shuttle-box and trough.

The frame of the loom is represented by *a a a*.

*b* is the lathe-shaft, which has the driving-pulley *c* affixed to its right-hand end. To the other end of the lathe-shaft *b* the cogged wheel *d* is affixed, which engages with the cogged wheel *e*. The relative proportions of the cogged wheels *d* and *e* are as one of the former to three of the latter. The cogged wheel *e* is affixed to and turns the cam-shaft *f*.

*g g* are the swords of the lathe, which are supported at their lower ends by the stands *h h* projecting from the frame *a*.

*i* represents the race-beam of the lathe connected with the upper ends of the swords *g g*. The lathe is connected with the lathe-shaft *b* by the connecting-bars *j j*, one of which is attached to the driving-pulley *c* and the other to the cogged wheel *d* by their respective stud-pins *k k*.

*l* represents the reed-frame in the common form.

To one end of the lathe a shuttle-box is applied in the ordinary way, as seen at A, Fig. 1, and from the other end of the lathe the race-beam is made to project beyond the shuttle-box to support the wire box or trough, as seen at B.

The wire box or trough and the guide which co-operates with it to take the wires into the shed of the warps may be understood as follows: The wire box or trough *n* may be composed of any suitable material, and is formed with a groove opening upward, as represented in Fig. 6. The back side of the wire box or trough *n* is made straight, and attached to the front side of the race-beam in such a manner as to form the front side of the shuttle-box at this end of the lathe, as seen in Fig. 4. *o* represents the back part of the same shuttle-box, which is constructed in the ordinary way. A rod, *p*, is placed over the groove of the wire box or trough *n*, and is supported by the standards *q q*, as represented in Figs. 1 and 6.

*r* is the wire picker or driver, the upper end of which clasps the rod *p*, while the lower end is formed to fill the groove of the wire box or trough *n*. The wire-picker *r* traverses the rod *p* at proper periods of time for driving the wire into the warp, and receives its motion from the upright lever *s*. The lever *s* vibrates on the stud *t*, at its lower end, and is connected at its upper end to the picker *r* by the pin *j'*, which extends from the picker *r*, and works in the slot *u*.

*v* is a strap, one end of which is connected with the lever *s*, and the other to the treadle *w*.

*x* is a pulley turning upon a stud projecting from one of the swords *g* of the lathe, around which the strap *v* passes to change the direction of its motion. The treadle *w* vibrates on the stud *y*. (Shown by the dotted lines in Fig. 2.) The cam *z* is affixed to the cam-shaft *f* and actuates the picker *r* through the intermediate parts just described. The figuring-wires may be drawn from the cloth and transferred to the wire box or trough *n* in the same manner as described in my Letters Patent for new and useful improvements in machinery for weaving brussels carpets, &c., dated March 20, 1847. When a wire is placed in the wire box or trough *n*, as seen in Fig. 6, and the picker *r* is at the outer end of the rod *p*, it is evident that when the picker *r* is moved forward toward the loom it will carry the wire along with it into the warp, as seen in Fig. 1, where the blue lines represent it as being part way out.

The guide for guiding and supporting the wires as they are introduced between the warps I shall now describe.

*a'* is a plate or bar, which is situated on the front side of the race-beam and slides up and down in the guide-plates *b' b'*. The guide-plates *b' b'* are formed with grooves in their inner edges which receive their respective ends of the plate or bar *a'*, as seen in Fig. 1.

*c' c'* are connecting-bars, the upper ends o which are attached to the bar *a'*, and thei lower ends to their respective arms *d' d'*. The arms *d' d'* are affixed to the shaft *e'*, which is supported by the stands *h h*.

*e''* is a lever, which vibrates in the stud *f'*, and is connected at one end to the arm *d'* by the bar *g'*, and actuated at the other end by the cam *h'*. The cam *h'* is affixed to the cam-shaft *f*, and communicates motion to the plate *a'* through the medium of the intervening parts just described.

*i' i'* are guides extending upward from the plate *a'*, which form the support and guide for the wires. These guides have a groove or opening in their upper ends to receive the wires, as represented in Figs. 2 and 5. The sides of the grooves or openings next to the wire-box are made tunnel-shaped, as shown in Fig. 4, to facilitate the ingress of the wires. The upper ends of the guides *i' i'* are made wedge-shaped, that they may freely pass between the warps.

During the operation of forming the cloth the plate *a'* is depressed so as to bring the points of the guides *i' i'* below the warps. Then when a wire is to be introduced into the shed of the warps said plate is raised and the guides *i' i'* pass up through the lower part of the warps to the position shown in the drawings. Then after the wire has been driven through the guides *i' i'* by the picker *r* said guides fall and leave the wire in the shed of the warps.

I have described the aforesaid guide or guides as working in connection with a certain mode of drawing the wires from under the pile of the cloth and transferring them to a box or trough preparatory to their being passed through said guide or guides, which mode of drawing and transferring said wires is described in my Letters Patent, above referred to, bearing date March 20, A. D. 1847; but I do not consider this connection as material to the use of my guide or guides, as they may be used equally well in connection with any other mode of drawing the wires from the pile; nor do I intend to limit myself to the precise construction and form of guide or guides above described, as the number of guides to be used, their form and position, must necessarily be varied to conform to the width of cloth to be wrought and the machinery to be employed to draw the wires from the cloth and slide them in said guide or guides—as, for example, when comparatively short wires are to be used, one guide placed at the side of the warps for the wire to slide through will be sufficient to support and guide it. When longer wires are to be used, more guides will be required, which guides may be made to pass up or down through the warps to bring them into the proper position to receive the wires.

The change of form and motion required to use the aforesaid guide or guides in connection with looms of different widths and in connection with the various modes of drawing the wires from the pile of the cloth and sliding them through said guides are such as will be obvious to any machinist acquainted with this kind of machinery, and may be made without essentially altering the character of my invention.

Having fully described my improvements, what I claim as new, and desire to secure by Letters Patent, is—

Guiding and supporting the pile-wires as they pass between the warps by means of a guide or guides through or on which the said wires slide, as above specified, or in any other way substantially the same.

E. B. BIGELOW.

Witnesses:

HELEN McG. MEANS,
KATHARINE PRINCE.